US010110596B2

(12) United States Patent
Satoh

(10) Patent No.: US 10,110,596 B2
(45) Date of Patent: Oct. 23, 2018

(54) INFORMATION PROCESSING SYSTEM, INFORMATION PROCESSING APPARATUS, METHOD FOR MANAGING ELECTRONIC CERTIFICATE

(71) Applicant: Jun Satoh, Tokyo (JP)

(72) Inventor: Jun Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 15/161,459

(22) Filed: May 23, 2016

(65) Prior Publication Data
US 2016/0352527 A1    Dec. 1, 2016

(30) Foreign Application Priority Data

May 28, 2015   (JP) .................................. 2015-108593

(51) Int. Cl.
*H04L 29/06* (2006.01)
*H04L 9/00* (2006.01)
*H04L 9/32* (2006.01)

(52) U.S. Cl.
CPC .......... *H04L 63/0823* (2013.01); *H04L 9/006* (2013.01); *H04L 9/3268* (2013.01); *H04L 63/06* (2013.01)

(58) Field of Classification Search
CPC ... H04L 9/006; H04L 9/3268; H04L 63/0823; H04L 63/06
See application file for complete search history.

(56) References Cited

U.S. PATENT DOCUMENTS

| 7,333,738 B2 * | 2/2008 | Nasu ..................... H04L 9/0894 399/109 |
| 7,627,751 B2 * | 12/2009 | Ikenoya .............. H04L 63/0823 713/158 |

(Continued)

FOREIGN PATENT DOCUMENTS

| CN | 1611032 | 4/2010 |
| JP | 2009-260703 | 11/2009 |

(Continued)

OTHER PUBLICATIONS

Office Action dated Jun. 29, 2018 issued with respect to the corresponding Chinese Patent Application No. 201610365899.6.

*Primary Examiner* — Eleni A Shiferaw
*Assistant Examiner* — Shahriar Zarrineh
(74) *Attorney, Agent, or Firm* — IPUSA, PLLC

(57) ABSTRACT

An information processing system comprising: an acceptance unit configured to receive an issuance request of an electronic certificate that is available in an electronic apparatus used by one or more users; an issuance unit configured to issue the electronic certificate based on the issuance request received by the acceptance unit; a management unit configured to store information indicating the electronic certificate issued by the issuance unit associated with information indicating one or more services that can be used with the electronic certificate, the one or more services being provided respectively by one or more servers; and a reporting unit configured to transmit authentication information for determining validity of the electronic certificate to at least one server among the one or more servers based on the information stored in the management unit.

7 Claims, 11 Drawing Sheets

(56) References Cited

U.S. PATENT DOCUMENTS

| | | | |
|---|---|---|---|
| 7,835,305 B2* | 11/2010 | Onishi | H04L 41/06 370/254 |
| 8,141,161 B2* | 3/2012 | Kuroki | G06F 3/1222 358/1.14 |
| 8,605,296 B2* | 12/2013 | Fry | G06F 21/64 358/1.1 |
| 9,094,214 B2 | 7/2015 | Satoh et al. | |
| 2002/0026578 A1* | 2/2002 | Hamann | H04L 9/3263 713/159 |
| 2002/0046340 A1* | 4/2002 | Fujishiro | H04L 9/006 713/171 |
| 2003/0014629 A1* | 1/2003 | Zuccherato | H04L 9/3268 713/156 |
| 2003/0135732 A1 | 7/2003 | Vaha-Sipila | |
| 2004/0073798 A1* | 4/2004 | Look | B60R 13/10 713/175 |
| 2004/0255113 A1* | 12/2004 | Ogura | H04L 63/062 713/156 |
| 2005/0005097 A1* | 1/2005 | Murakawa | H04L 63/0442 713/156 |
| 2005/0160259 A1* | 7/2005 | Ogura | H04L 9/00 713/156 |
| 2006/0100888 A1* | 5/2006 | Kim | G06Q 20/3674 705/67 |
| 2006/0107039 A1* | 5/2006 | Sugiura | G06F 21/608 713/156 |
| 2006/0143700 A1* | 6/2006 | Herrmann | H04L 63/0823 726/14 |
| 2006/0200854 A1* | 9/2006 | Saito | G06F 21/33 726/2 |
| 2007/0011293 A1* | 1/2007 | Lee | H04N 1/00217 709/223 |
| 2007/0016783 A1* | 1/2007 | Saito | H04L 9/3247 713/175 |
| 2007/0076253 A1* | 4/2007 | Shima | G06F 3/1222 358/1.15 |
| 2007/0234047 A1* | 10/2007 | Miyazawa | H04L 9/3268 713/158 |
| 2007/0282975 A1* | 12/2007 | Kato | H04L 12/2834 709/217 |
| 2008/0155667 A1* | 6/2008 | Hamachi | H04L 63/0823 726/6 |
| 2009/0216785 A1* | 8/2009 | Sato | G06F 21/606 |
| 2009/0265545 A1* | 10/2009 | Satoh | H04L 9/3263 713/156 |
| 2009/0265546 A1* | 10/2009 | Nasu | H04L 63/0823 713/156 |
| 2009/0307756 A1* | 12/2009 | Kang | G06F 21/6218 726/4 |
| 2010/0174650 A1* | 7/2010 | Nonaka | G06Q 20/045 705/44 |
| 2011/0185183 A1* | 7/2011 | Yamamoto | G06F 21/33 713/182 |
| 2012/0204033 A1* | 8/2012 | Etchegoyen | G06F 21/33 713/175 |
| 2012/0222101 A1* | 8/2012 | Iwasaki | H04L 63/0823 726/7 |
| 2013/0057895 A1* | 3/2013 | Okazawa | H04L 9/3263 358/1.14 |
| 2013/0061041 A1* | 3/2013 | Inoue | G06F 21/44 713/156 |
| 2013/0063760 A1* | 3/2013 | Kishimoto | G06F 21/33 358/1.14 |
| 2013/0201519 A1* | 8/2013 | Duyk | H04L 12/2838 358/1.15 |
| 2013/0227275 A1* | 8/2013 | Satoh | H04L 63/0823 713/156 |
| 2013/0318354 A1* | 11/2013 | Entschew | G06F 21/645 713/175 |
| 2014/0136655 A1* | 5/2014 | Oshima | H04L 63/0823 709/217 |
| 2014/0240753 A1* | 8/2014 | Anno | G06F 3/1236 358/1.15 |
| 2015/0180861 A1* | 6/2015 | Omori | H04L 63/0823 713/156 |
| 2015/0334109 A1* | 11/2015 | Kasai | H04L 29/06 358/1.14 |

FOREIGN PATENT DOCUMENTS

| | | |
|---|---|---|
| JP | 2011-192061 | 9/2011 |
| JP | 2016-085621 | 5/2016 |

* cited by examiner

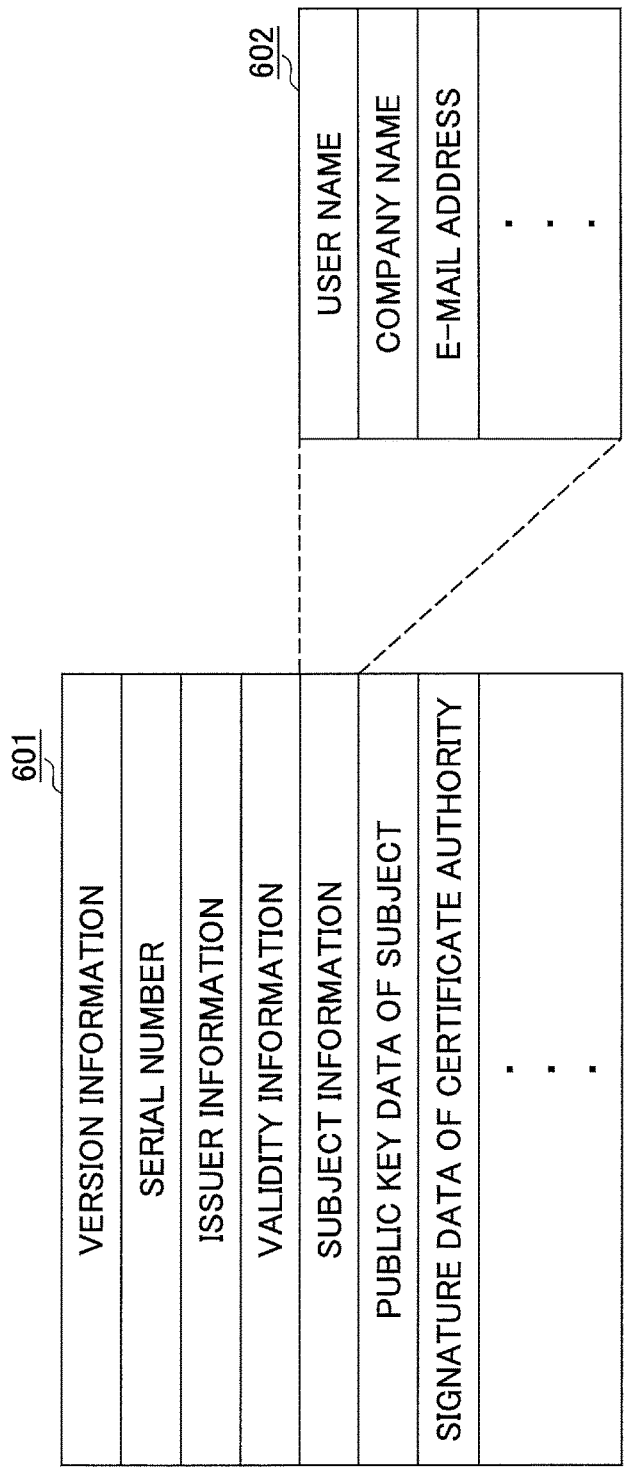

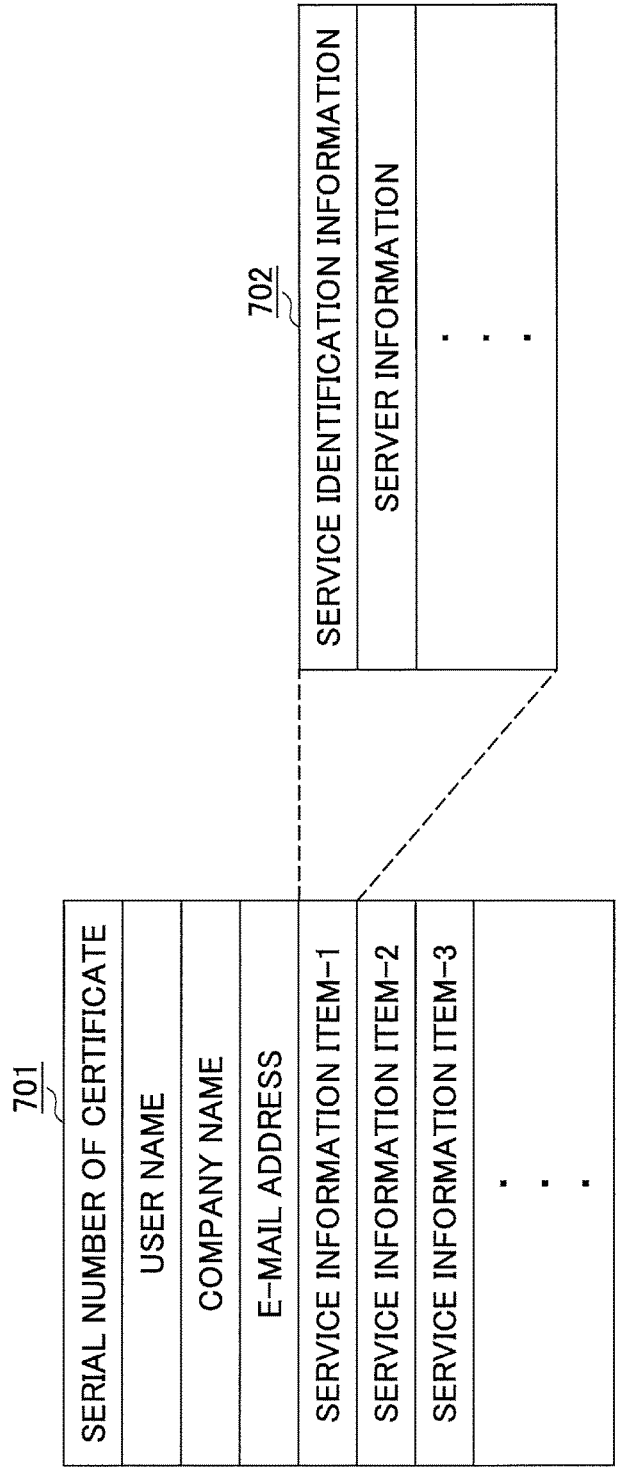

FIG.8A

| AUTHENTICATION INFORMATION | | 801 |
|---|---|---|
| IDENTIFICATION INFORMATION OF CERTIFICATE | SUBJECT INFORMATION | |
| xxxx0001 | SUBJECT INFORMATION ITEM-1 | ... |
| xxxx0002 | SUBJECT INFORMATION ITEM-2 | ... |
| xxxx0005 | SUBJECT INFORMATION ITEM-5 | ... |
| ... | ... | |

FIG.8B

| EXPIRATION INFORMATION | 802 |
|---|---|
| IDENTIFICATION INFORMATION OF CERTIFICATE | |
| xxxx0003 | |
| xxxx0004 | |
| ... | |

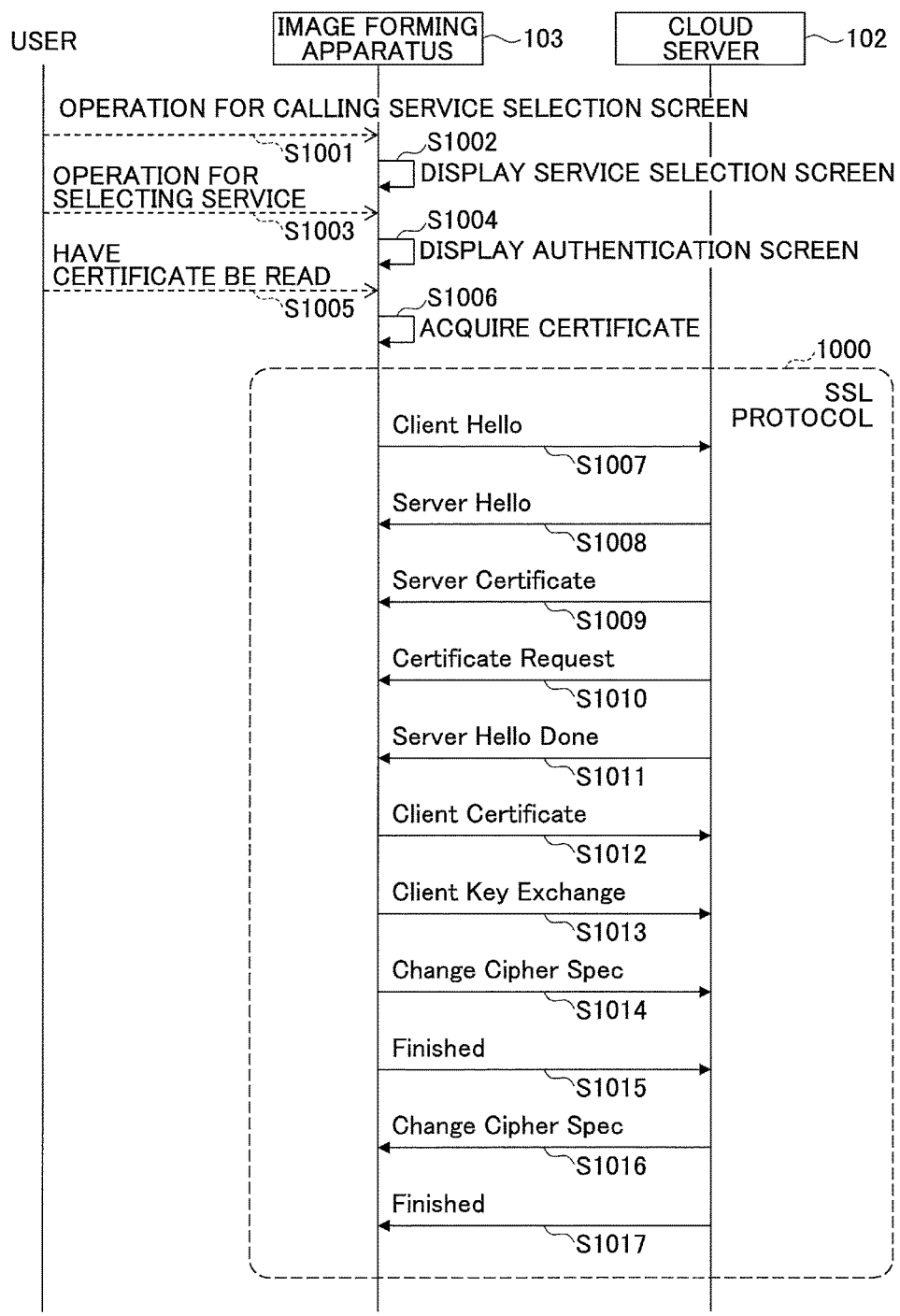

INFORMATION PROCESSING SYSTEM, INFORMATION PROCESSING APPARATUS, METHOD FOR MANAGING ELECTRONIC CERTIFICATE

BACKGROUND OF THE INVENTION

1. Field of the Invention

The present disclosure relates to information processing systems, information processing apparatuses, methods for managing electronic certificate.

2. Description of the Related Art

Various types of cloud services are provided, in which, for example, an electronic apparatus used in an office, etc., as an image forming apparatus, etc., is operated in cooperation with one or more computers (hereinafter, simply referred to as servers) connected via a network such as the internet. For example, services are provided such that the image forming apparatus scans a document to generate image data and transmit the image data to the server, whereas the server performs image processing related to the image data, or stores the image data in a storage unit.

Also, an image forming apparatus is known, which performs a certain process (including an authentication process) when a user holds an apparatus having a NFC (Near Field Communication) function over an NFC reader/writer, where an individual electronic certificate has been stored in the apparatus (e.g., Patent Document 1).

For example, workload of the user for inputting user information, password, etc., can be reduced by using the electronic certificate stored in an electronic apparatus including an image forming apparatus, as disclosed in Patent Document 1, etc., in a case where a plurality of users uses the image forming apparatus.

However, for example, in a case where a plurality of cloud services using an electronic apparatus such as the image forming apparatus are provided, upon the user logging-in, the user needs to precisely select certificate information, an IC card, etc., corresponding to respective services in the conventional technology. Thus, in a case where a plurality of users use the electronic apparatus such as the image forming apparatus, it is difficult to reduce the user's workload for using a plurality of cloud services in the conventional technology.

RELATED ART DOCUMENT

Patent Document

[Patent Document 1]: Japanese Unexamined Patent Application Publication No. 2011-192061

SUMMARY OF THE INVENTION

An object of the present disclosure is to provide an information processing system that can reduce user's workload for using a plurality of cloud services, where an electronic apparatus used by a plurality of users is used in the cloud services.

The following is adopted to achieve the object.

In one aspect of the embodiments of the present invention, there is provided an information processing system comprising: an acceptance unit configured to receive an issuance request of an electronic certificate that is available in an electronic apparatus used by one or more users; an issuance unit configured to issue the electronic certificate based on the issuance request received by the acceptance unit; a management unit configured to store information indicating the electronic certificate issued by the issuance unit associated with information indicating one or more services that can be used with the electronic certificate, the one or more services being provided respectively by one or more servers; and a reporting unit configured to transmit authentication information for determining validity of the electronic certificate to at least one server among the one or more servers based on the information stored in the management unit.

Other objects, features and advantages of the present invention will become more apparent from the following detailed description when read in conjunction with the accompanying drawings.

BRIEF DESCRIPTION OF THE DRAWINGS

FIG. 6 is a diagram illustrating example information included in the certificate.

FIG. 7 is a diagram illustrating example user information.

FIG. 8A is a diagram illustrating example authentication information.

FIG. 8B is a diagram illustrating example expiration information.

FIG. 10 is a sequence diagram illustrating an example process for using the cloud service of the present embodiment.

DETAILED DESCRIPTION OF THE PREFERRED EMBODIMENTS

In the following, embodiments of the invention will be described with reference to accompanying drawings.

<System Configuration>

In the following, a configuration of an information processing system of an embodiment will be described.

Figure 1:
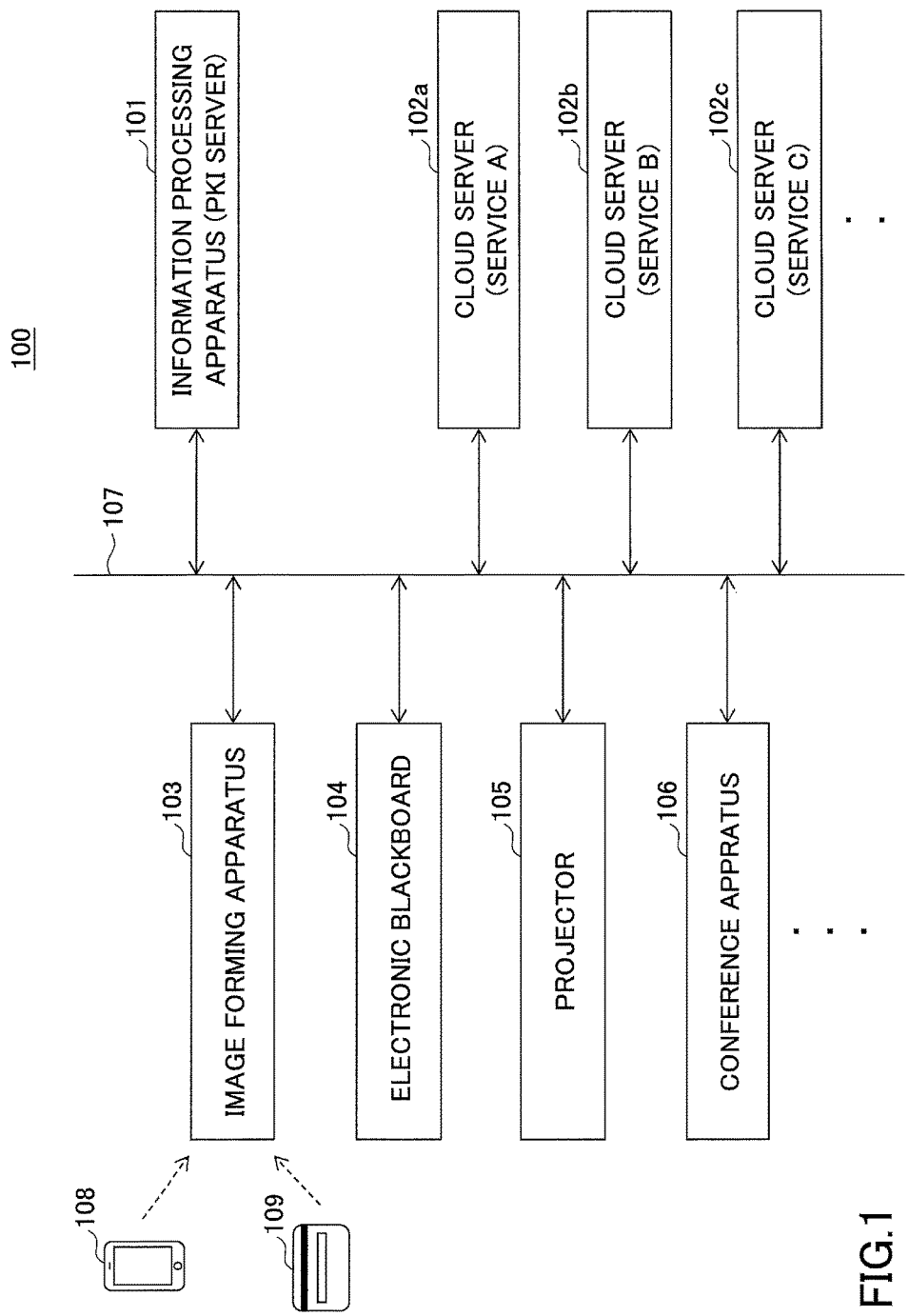
FIG. 1 is a diagram illustrating an example configuration of an information processing system of an embodiment of the present invention.

FIG. 1 is a diagram illustrating an example configuration of the information processing system of the present embodiment of the invention. The information processing system 100 includes a plurality of electronic apparatuses including an information processing apparatus 101, a plurality of cloud servers 102a, 102b, 102c, etc., an image forming apparatus 103, an electronic blackboard 104, a projector 105 and a conference apparatus 106. Also, for example, the information processing apparatus 101, the plurality of cloud servers 102a, 102b, 102c, etc., and a plurality of electronic apparatuses are connected to network 107 such as the Internet or LAN (Local Area Network) being capable of communicating each other.

The information processing apparatus (PKI server) 101 is a server for providing a service of PKI (Public Key Infrastructure). For example, the information processing apparatus 101 issues, distributes, or manages an electronic certificate (hereinafter referred to as certificate) generated by using public key encryption.

The cloud servers 102a, 102b and 102c are servers for respectively providing service A, service B and service C. Additionally, in the following, an arbitrary cloud server (or cloud servers) among the plurality of cloud servers 102a, 102b, 102c, etc., is referred to as a "cloud server (or cloud servers) 102". Also, a number of the cloud servers 102 may be arbitrarily chosen, wherein the number is two or more.

The cloud server 102 performs a user authentication process for using a certain service, etc., by using the certificate provided by the information processing apparatus (PKI server) 101.

The image forming apparatus 103, the electronic blackboard 104, the projector 105 and the conference apparatus 106 are examples of electronic apparatuses. The electronic apparatus of the present embodiment, with which a plurality of services (e.g., a print service and a storage service) provided by the cloud servers 102 can be used, is used by one or more users.

Also, for example, the electronic apparatus of the present embodiment acquires the certificate stored in an information terminal such as a smartphone or an IC card 109 such as an employee card, thereby performing an authentication process for using a certain service provided by the cloud server 102. Thus, for example, the user can omit an input operation of an ID, a password, etc., into the electronic apparatus, instead, the electronic apparatus retrieves the certificate stored in the information terminal 108, and the like.

In the aforementioned configuration, for example, the information processing apparatus 101 includes a certificate authority for issuing the certificate, and issues a certificate in response to accepting an issuance request of certificate from a user of the information terminal 108 to transmit it by means of an encrypted e-mail, etc., to the information terminal 108.

Also, the information processing apparatus 101 manages information related to the user of the issued certificate associated with a plurality of cloud services that can be used with the certificate. Further, the information processing apparatus 101 reports certain authentication information of the issued certificate to the cloud servers 102a-102c providing the cloud services that can be used with the certificate.

Meanwhile, the cloud servers have stored a root certificate of the certificate authority of the information processing apparatus 101 in advance, and perform a user authentication of the cloud service based on the authentication information reported from the information processing apparatus 101.

For example, the user of the information terminal 108 has the image forming apparatus 103 read the certificate reported from the information processing apparatus 101 when the user uses the service A provided by the cloud server 102a by using the image forming apparatus 103.

For example, the image forming apparatus 103 acquires the certificate from the information terminal 108 through NFC (Near Field Communication), etc., and performs mutual authentication with the cloud server 102a by using the acquired certificate. The cloud server 102a authenticates the certificate transmitted from the image forming apparatus 103 based on the root certificate of the certificate authority of the information processing apparatus 101 and the authentication information reported from the information processing apparatus 101.

Similarly to the cloud server 102a, cloud servers 102b and 102c also hold the root certificate of the certificate authority of the information processing apparatus 101 and the authentication information reported from the information processing apparatus 101. Therefore, the user of the information terminal 108 can use a plurality of cloud services provided by the cloud servers 102a-102c by using one certificate reported from the information processing apparatus 101.

As described above, according to the present embodiment, information processing system that can reduce user's workload for using a plurality of cloud services can be provided, where an electronic apparatus used by a plurality of users is used in the cloud services.

<Hardware Configuration>

In the following, hardware configurations of the information processing apparatus 101, the cloud server 102, the electronic apparatus and the information terminal 108 will be described.

<Hardware Configuration of Information Processing Apparatus and Cloud Server>

The information processing apparatus 101 and the cloud server 102 have a general hardware configuration of a computer. Also, the information processing apparatus 101 and the cloud server 102 may be configured by a plurality of computers.

Figure 2:
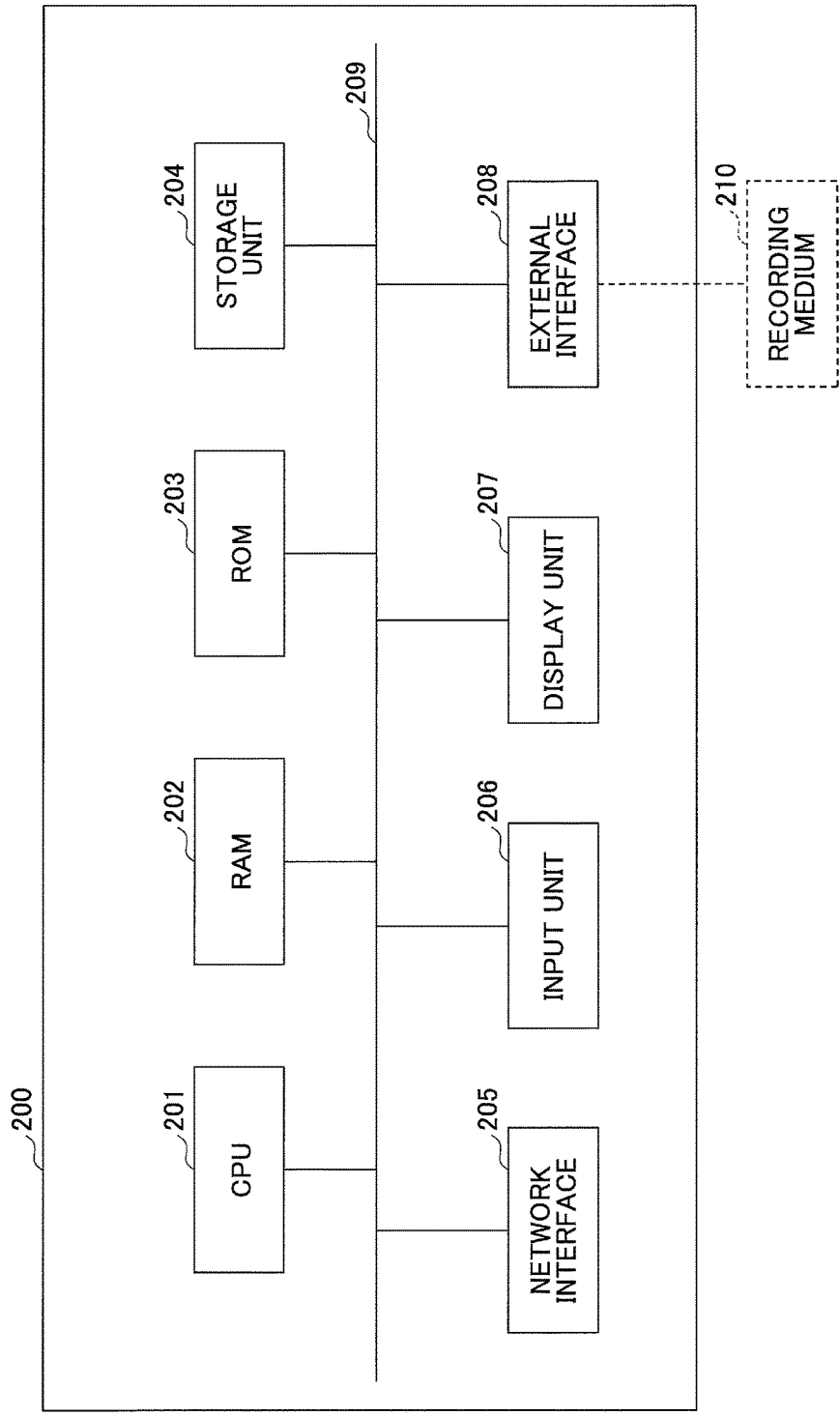
FIG. 2 is a diagram for illustrating an example hardware configuration of a computer of the present embodiment.

FIG. 2 is a diagram for illustrating an example hardware configuration of a computer of the present embodiment. For example, the computer 200 includes a CPU (Central Processing Unit) 201, a RAM (Random Access Memory) 202, a ROM (Read Only Memory) 203, a storage unit 204, a network interface 205, an input unit 206, a display unit 207, an external interface 208 a bus 209, and the like.

The CPU 201 is a processor for retrieving programs and data stored in the ROM 203, the storage unit 204, etc., into the RAM 202 to process them, thereby achieving respective functions of the computer 200. The RAM 202 is a volatile memory serving as a work area, etc., of the CPU 201. The ROM 203 is a nonvolatile memory capable of holding programs and data even when power is turned off, and configured by a flash ROM, or the like. For example, the storage unit 204 is a storage device such as a HDD (Hard Disk Drive) or a SSD (Solid State Drive), and stores an OS (Operation System), an application program, data, etc., therein.

For example, the network interface 205 is a communication interface of wired/wireless LAN for connecting the computer 200 to the network 107 to perform data transmission/reception with other computers or electronic apparatuses, and the like.

For example, the input unit 206 is an input device such as a keyboard, a mouse, a touch panel for accepting operational input to the computer 200. For example, the display unit 207 is a display device such as a LCD (Liquid Crystal Display) for displaying processing results of the computer 200. Additionally, the input unit 206 and the display unit 207 may be provided externally.

The external interface 208 is an interface for connecting the computer 200 to an external apparatus. For example, the external apparatus includes a recording medium, such as a USB (Universal Serial Bus) memory, a memory card and an optical disc, and respective electronic apparatuses, and the like.

The bus 209 is connected to respective units or elements described above, and transmits an address signal, a data signal, control signals, and the like.

<Hardware Configuration of Image Forming Apparatus>

Here, a hardware configuration of the image forming apparatus 103 is described as an example electronic apparatus of the present embodiment.

Figure 3:
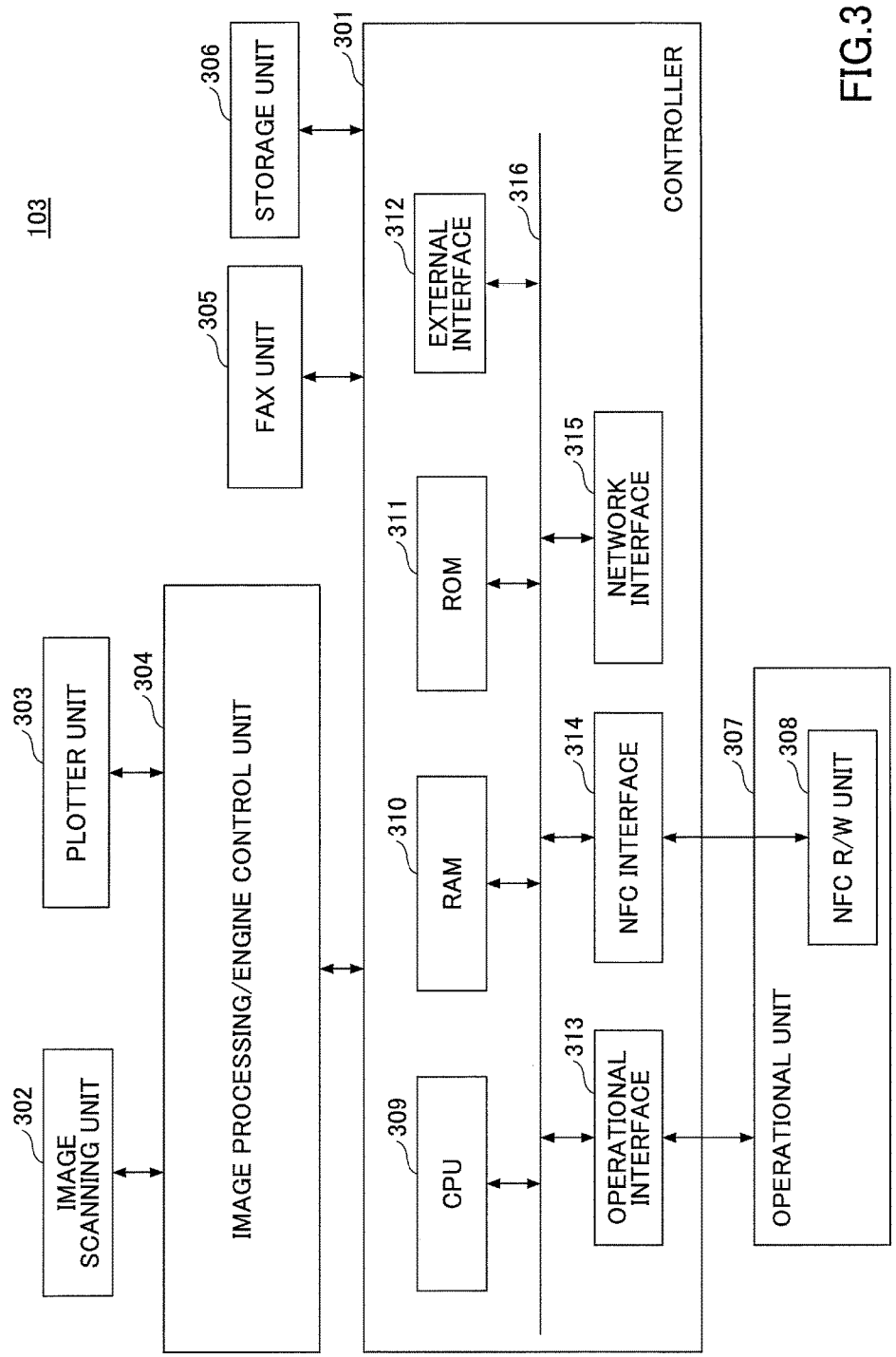
FIG. 3 is a block diagram illustrating an example hardware configuration of the image forming apparatus of the present embodiment.

FIG. 3 is a block diagram illustrating an example hardware configuration of the image forming apparatus of the present embodiment. The image forming apparatus 103 includes a controller 301, an image scanning unit 302, a plotter unit 303, an image processing/engine control unit 304, a FAX unit 305, a storage unit 306, an operational unit 307, a NFC R/W (Reader/Writer) unit 308, and the like.

For example, the controller 301 has a general hardware configuration of a computer, and includes a CPU 309, a RAM 310, a ROM 311, an external interface 312, an operational interface 313, a NFC interface 314, a network interface 315, etc., where the respective elements or units are connected via a bus 316.

The CPU 309 is a processor for retrieving programs and data stored in the ROM 311, the storage unit 306, etc., into the RAM 310 to process them, thereby achieving respective functions of the image forming apparatus 103. The RAM 310 is a volatile memory serving as a work area, etc., of the CPU 309. For example, the ROM 311 is a nonvolatile memory capable of holding programs and data even when power is turned off, and configured by a flash ROM, or the like.

The external interface 312 is an interface for connecting the controller to an external apparatus. For example, the external apparatus includes a recording medium such as a USB (Universal Serial Bus) memory, a memory card, an optical disc, and an information terminal, an electronic apparatus, and the like. The operational interface 313 is an interface for connecting the operational unit 307 to the controller 307. The NFC interface 314 is an interface for connecting the NFC R/W unit 308 to the controller 301, where the NFC R/W unit 308 performs read/write operation of data from/into an NFC device through the NFC communication.

For example, the network interface 315 is an interface for connecting the image forming apparatus 103 to the network 107 to perform data transmission/reception with other apparatuses connected to the network 107.

The image scanning unit 302 is a scanner device for scanning a document, etc., under control of the image processing/engine control unit 304. The plotter unit 303 is a plotter device for forming an image on a paper, etc., under control of the image processing/engine control unit 304. The image processing/engine control unit 304 controls the image scanning unit 302 and the plotter unit 303 to perform an image processing.

The FAX unit 305 includes a hardware engine for transmitting/receiving facsimile and a control unit thereof. For example, the storage unit 306 is a storage device such as a HDD or a SSD, and stores an OS (Operation System), an application program, information and data including image data therein.

The operational unit 307 is a hardware unit for accepting operational input from the user as well as a hardware unit (display unit) for displaying information for the user. Additionally, in the example shown in FIG. 3, the operational unit 307 includes a NFC R/W unit 308 for performing read/write operation of data from/into an NFC device through the NFC communication. Additionally, the example shown in FIG. 3 is a non-limiting example, and the NFC R/W unit 308 may be provided separately from the operational unit.

Moreover, similarly to the image forming apparatus 103, the electronic apparatus of the present embodiment has a general hardware configuration of a computer including an interface (e.g., NFC R/W unit 308, etc.) for acquiring the certificate form the information terminal 108, the IC card 109, or the like.

<Hardware Configuration of Information Terminal>

Figure 4:
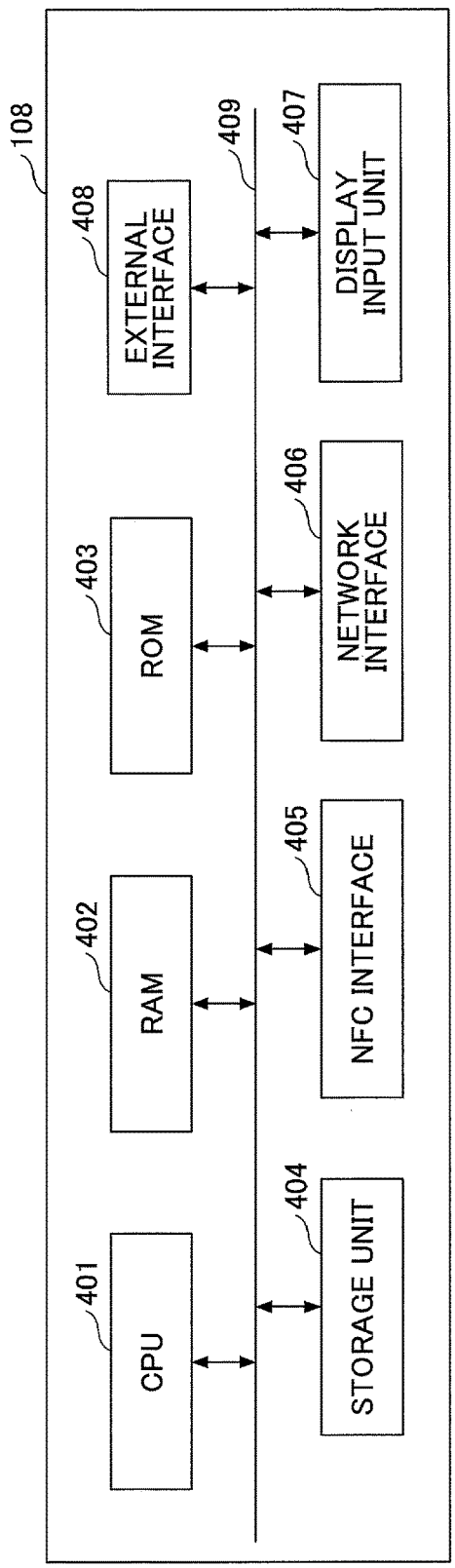
FIG. 4 is a diagram illustrating an example hardware configuration of the information terminal of the present embodiment.

FIG. 4 is a diagram illustrating an example hardware configuration of the information terminal of the present embodiment. The information terminal 108 has a general hardware configuration of a computer, and includes a CPU 401, a RAM 402, a ROM 403, a storage unit 404, a NFC interface 405, a network interface 406, a display input unit 407, an external interface 408 a bus 409, and the like.

The CPU 401 is a processor for retrieving programs and data stored in the ROM 403, the storage unit 404, etc., into the RAM 402 to process them, thereby achieving respective functions of the information terminal 108. The RAM 402 is a volatile memory serving as a work area, etc., of the CPU 401. The ROM 403 is a nonvolatile memory capable of holding programs and data even when power is turned off, and configured by a flash ROM, or the like. For example, the storage unit 404 is a storage device such as a SSD (Solid State Drive) or a flash ROM, and stores an OS, an application program, data, etc., therein.

The NFC interface 405 is a communication interface for performing a short-range wireless communication of the NFC. For example, the network interface 406 is a communication interface such as a wireless LAN adopter for connecting the information terminal 108 to the network 107 to perform data transmission/reception to/from the information processing apparatus 101, the cloud server 102, and the like.

For example, the display input interface 407 is a display input device such as a touch panel display including a touch panel and a display. The display input interface 407 includes an input unit for inputting operations into the information terminal 108 and a display unit for displaying processing results, etc., of the information terminal 108. Additionally, the display unit and the input unit of the display input unit 407 may be provided separately. The external interface 408 is an interface for connecting the information terminal 108 to an external apparatus. For example, the external apparatus includes a recording medium, such as a USB memory, a memory card and an optical disc, and respective electronic apparatuses, and the like. The bus 409 transmits an address signal, a data signal, control signals, and the like.

<Functional Configuration>

In the following, a functional configuration of the information processing system 100 will be described.

Figure 5:
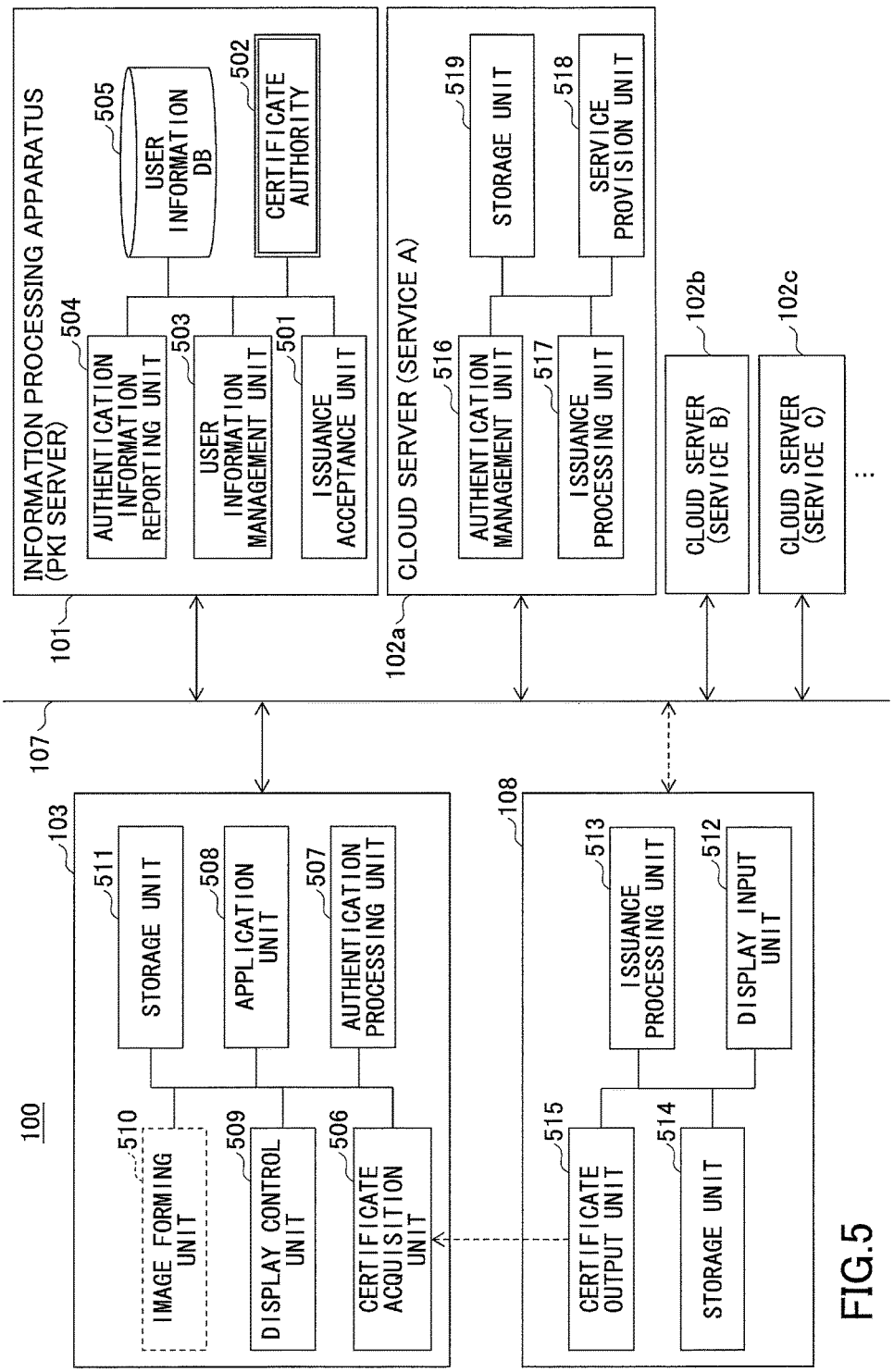
FIG. 5 is a diagram illustrating a functional configuration of the information processing system of the present embodiment.

FIG. 5 is a diagram illustrating a functional configuration of the information processing system of the present embodiment.

<Functional Configuration of Information Processing Apparatus>

For example, the information processing apparatus (PKI server) 101 includes an issuance acceptance unit 501, a certificate authority 502, a user information management unit 503, an authentication information reporting unit 504 and a user information DB 505, and the like.

The issuance acceptance unit 501 receives an issuance request for requesting issuance of the certificate from the information terminal 108, the cloud server 102, etc., via the network interface 205, and requests the certificate authority 502 to issue the certificate in response to receiving the issuance request. The issuance request received by the issuance acceptance unit 501 includes user information such as a name of a user, a name of a company, and an e-mail address.

Preferably, the issuance acceptance unit 501 reports the certificate issued by the certificate authority 502 to the e-mail address included in the issuance request by means of encrypted e-mail such as S/MIME (Secure/Multipurpose Internet Mail Extensions). Additionally, an operator, etc., may distribute or install the issued certificate.

Additionally, the present embodiment is described assuming that the certificate can be used for a plurality of cloud services by using an electronic apparatus such as the image forming apparatus 103, the electronic blackboard 104, a projector 105, a conference apparatus 106, etc., where the electronic apparatus is used by one or more users.

The certificate authority 502 is a CA (Certification Authority) of PKI (Public Key Infrastructure) that issues the certificate based on the user information included in the issuance request received by the issuance acceptance unit 501. Additionally, the certificate authority 502 may be achieved by the computer 200 that is different from the information processing apparatus 101.

Here, the certificate issued by the certificate authority 502 is a public key certificate used in the Public Key Infrastructure.

Preferably, the certificate issued by the certificate authority 502 includes the user information (user name, company name, e-mail address, etc.) included in the issuance request received by the issuance acceptance unit 501.

FIG. 6 is a diagram illustrating information included in the certificate of the present embodiment. For example, the certificate 601 issued by the certificate authority 502 includes version information, a serial number, issuer information, validity information, subject information, public key data of the subject, signature data of the certificate authority, and the like.

The version information indicates a version of the certificate 601.

The serial number indicates a serial number allocated to the certificate 601 upon the certificate 601 being issued.

The issuer information is related to the issuer of the certificate 601, and includes e.g., a country name, an organization name, a name of the certificate authority 502, and the like.

The validity information indicates an expiration date of the certificate 601.

The subject information is related to the subject (user, etc.) of the certificate 601. For example, the user name, the company name, the e-mail address, etc., are included in the subject information 602 shown in FIG. 6.

The public key data of the subject is public key data of the subject (user, etc.) of the certificate 601.

The signature data of the certificate authority is data of electronic signature of the certificate authority 502 that has issued the certificate 601.

Referring back to FIG. 5, descriptions on the information processing apparatus 101 will be continued.

The user information management unit (management unit) 503 stores information of the certificate issued by the certificate authority 502 associated with information of the services that can be used with the certificate issued by the certificate authority 502 in the user information DB 505 to manage them.

Additionally, various operations of the services that can be used with the certificate issued by the certificate authority 502 may be performed. Here, for example, services that can be used with the certificate are defined in advance by an operator of the information processing apparatus (PKI) 101 and operators of respective cloud servers 102.

FIG. 7 is a diagram illustrating example user information of the present embodiment. For example, the user information 701 shown in FIG. 7 is stored in the user information DB 505 on a certificate-by-certificate basis. The user information 701 includes a serial number of the certificate 601, subject information (user name, company name, e-mail address, etc.), service information items (service information item-1, service information item-2, service information item-3) related to services that can be used with the certificate 601.

The serial number of the certificate 601 corresponds to the serial number shown in FIG. 6.

The subject information (user name, company name, e-mail address, etc.) corresponds to the subject information 602 included in the certificate 601 shown in FIG. 6.

For example, the services information 702 indicating services that can be used with certificate 601 includes service identification information (or identification information of cloud server 102, etc.), server information (address information of cloud server 102, etc.), and the like.

Referring back to FIG. 5, descriptions of the functional configuration of the information processing apparatus 101 will be continued.

The authentication information reporting unit 504 transmits the authentication information, through the network interface 205, to respective cloud servers 102 providing services that can be used with the certificate issued by the certificate authority 502. For example, the authentication information reporting unit 504 can specify a destination of the authentication information based on the services information 702 shown in FIG. 7.

For example, the authentication information includes information of the certificate issued by the certificate authority 502. Also, preferably, the authentication information includes information (expiration list) indicating expired certificates among the certificates issued by the certificate authority 502.

FIG. 8A and FIG. 8B are diagrams illustrating example authentication information of the present embodiment. For example, in authentication information 801 shown in FIG. 8A, identification information (serial number) of the certificate 601 that is authenticated and authorized is included. Further, as shown in FIG. 8A, the subject information 602 of the certificate 601 or at least a part of the subject information 602 (user name, company name, e-mail address, etc.) may be included in the authentication information 801. Here, the subject information 602 of the certificate 601 is included in the authentication information 801. Additionally, the identification information of the certificate and the subject information 602 are example of the information of the certificate 601.

Also, as shown in FIG. 8B, the authentication information 801 may include expiration information 802. For example, the expiration information 802 includes identification information (serial numbers, etc.) of expired certificates among the certificates issued by the certificate authority 502.

Referring back to FIG. 5, descriptions of the functional configuration of the information processing apparatus 101 will be continued.

For example, the issuance acceptance unit 501, the certificate authority 502, the user information management unit 503 and the authentication information reporting unit 504 are achieved by a program executed by the CPU 201 shown in FIG. 2.

The user information DB 505 is a storage unit managed by the user information management unit 503, and stores the user information 701 in which the information of the certificate issued by the certificate authority 502 is recorded associated with the services that can be used with the certificate issued by the certificate authority 502. Additionally, the user information DB 505 is achieved by the storage unit 204 shown in FIG. 2 and a program executed by the CPU 201 shown in FIG. 2. Or, the user information DB 505 may be achieved by the computer 200 (storage server, etc.) different from the information processing apparatus 101.

According to the aforementioned configuration, the information processing apparatus (PKI server) 101 issues the certificate that can be used in a plurality of cloud servers 102 in response to accepting the issuance request of the certificate, and reports the authentication information to the plurality of the cloud servers 102.

<Functional Configuration of Cloud Server>

The cloud server 102 includes an authentication management unit 516, an issuance processing unit 517, a service provision unit 518, a storage unit 519, and the like.

For example, the authentication management unit 516 stores the authentication information reported from the information processing apparatus 101 through the network interface 205 in the storage unit 519 to manage it. Also, the authentication management unit 516 performs an authentication (SSL authentication) of the certificate included in a connection request from the electronic apparatus such as the image forming apparatus 103 based on the authentication information stored in the storage unit 519.

Preferably, the authentication management unit 516 stores the root certificate of the certificate authority 502 reported from the information processing apparatus 101 in the storage unit 519 to manage it. Or, the root certificate of the certificate authority 502 may be installed in the cloud server 102 by an operator, etc., of the cloud server 102.

For example, the issuance processing unit 517 accepts a usage application of the service provided by the cloud server 102 from the information terminal 108, etc., thereby transmitting an issuance request of the certificate to the information processing apparatus 101. For example, the issuance request includes the user information (user name, company name, e-mail address, etc.), the identification information of the cloud server 102 included in the usage application, and the like. According to the issuance processing unit 517, the user of the cloud server 102 can be issued the certificate from the information processing apparatus 101, etc., by only transmitting the usage application to the cloud server 102.

The service provision unit 518 provides services corresponding to respective cloud servers 102.

Additionally, for example, the authentication management unit 516, the issuance processing unit 517 and the service provision unit 518 are achieved by a program executed by the CPU 201 shown in FIG. 2.

For example, the storage unit 519 stores the authentication information and the root certificate of the certificate authority 502 managed by the authentication management unit 516, and the like. For example, the storage unit 519 is achieved by the storage unit 204 shown in FIG. 2, the CPU 201 shown in FIG. 2, and the like.

According to the aforementioned configuration, respective cloud servers 102 authenticate the certificate transmitted from the electronic apparatus such as the image forming apparatus 103, etc., based on the authentication information reported from the information processing apparatus (PKI server) 101 and the root certificate of the certificate authority 502.

Additionally, cloud servers 102b and 102c shown in FIG. 5 respectively have similar configuration to that of the cloud server 102a.

<Functional Configuration of Image Forming Apparatus>

The image forming apparatus 103 is an example electronic apparatus of the present embodiment, and for example, includes a certificate acquisition unit 506, an authentication processing unit 507, an application unit 508, a display control unit 509, an image forming unit 510, a storage unit 511, and the like.

The certificate acquisition unit 506 acquires the certificate from the information terminal 108, the IC card 109, etc., and for example, the certificate acquisition unit 506 is achieved by the NFC R/W unit 308, the NFC interface 314, a program executed by the CPU 309 shown in FIG. 3, and the like. For example, the certificate acquisition unit 506 may temporarily store the acquired certificate in the storage unit 511, and the like.

The authentication processing unit 507 requests the cloud server 102 designated by the user, etc., to perform an authentication by using the certificate acquired by the certificate acquisition unit 506, and performs a certain authentication processing (SSL protocol, etc.). For example, the authentication processing unit 507 is achieved by a program executed by the CPU 309 shown in FIG. 3.

The application unit 508 performs processes for using the services provided by the respective cloud servers 102.

The display control unit 509 displays operational menu, etc., in the operational unit 307 shown in FIG. 3, and also accepts operational input from the user.

In a case of the image forming apparatus 103, the image forming unit 510 is operated for achieving respective functions of printing, scanning, copying, faxing, and the like. For example, the image forming unit 510 is achieved by the image scanning unit 302, the plotter unit 303, the image processing/engine control unit 304, the FAX unit 305, a program executed by the CPU 309 shown in FIG. 3, and the like. Additionally, the electronic apparatuses of the present embodiment include discrete functional units. For example, in a case where the electronic apparatus is the projector, it includes an image projection unit instead of the image forming unit 510. Similarly, a display input unit is included in the electronic blackboard, and a conference control unit is included in the conference apparatus.

For example, the storage unit 511 temporarily stores the certificate acquired by the certificate acquisition unit 506, and the storage unit 511 is achieved by the RAM 310, a program executed by the CPU 309 shown in FIG. 3, and the like.

According to the aforementioned configuration, the image forming apparatus 103 connects to the cloud server 102 that provide a service designated by the user by using the certificate acquired form the information terminal 108, the IC card 109, etc., to perform processes for using the designated service.

<Functional Configuration of Information Terminal>

For example, the information terminal 108 includes a display input unit 512, an issuance processing unit 513, a storage unit 514, a certificate output unit 515, and the like.

For example, the display input unit 512 displays a request screen for requesting the information processing apparatus 101 to issue the certificate, or an application screen for applying the usage to the cloud server 102, thereby accepting input information. For example, the display input unit 512 is achieved by the display input unit 407, a program executed by the CPU 401 shown in FIG. 4, and the like.

The issuance processing unit 513 transmits the issuance request to the information processing apparatus 101 through the network interface 406 based on the information accepted by the display input unit 512.

Or, the issuance processing unit 513 transmits the usage application to the cloud server 102 through the network interface 406 based on the information accepted by the display input unit 512.

Additionally, the issuance request and the usage application transmitted by the issuance processing unit 513 include the user information that includes the name of a user, the name of a company, the e-mail address, and the like.

Preferably, the issuance processing unit 513 stores the certificate in the storage unit 514, which is reported form the information processing apparatus 101 by means of e-mail. For example, the issuance processing unit 513 is achieved by a program executed by the CPU 401 shown in FIG. 4.

The storage unit 514 stores the certificate reported form the information processing apparatus 101, and for example the storage unit 514 is achieved by the storage unit 404 shown in FIG. 4, and the like.

The certificate output unit 515 outputs the certificate stored in the storage unit 514 to the image forming apparatus 103, etc., and for example, the certificate output unit 515 is achieved by the NFC interface 405, a program executed by the CPU 401 shown in FIG. 4, and the like.

According to the aforementioned configuration, the information terminal 108 can output the certificate reported form the information processing apparatus (PKI server) 101 to the electronic apparatus such as the image forming apparatus 103.

<Process Flow>

In the following, process flow of the information processing system 100 will be described.

<Process Flow of Information Processing Apparatus>

Figure 9:
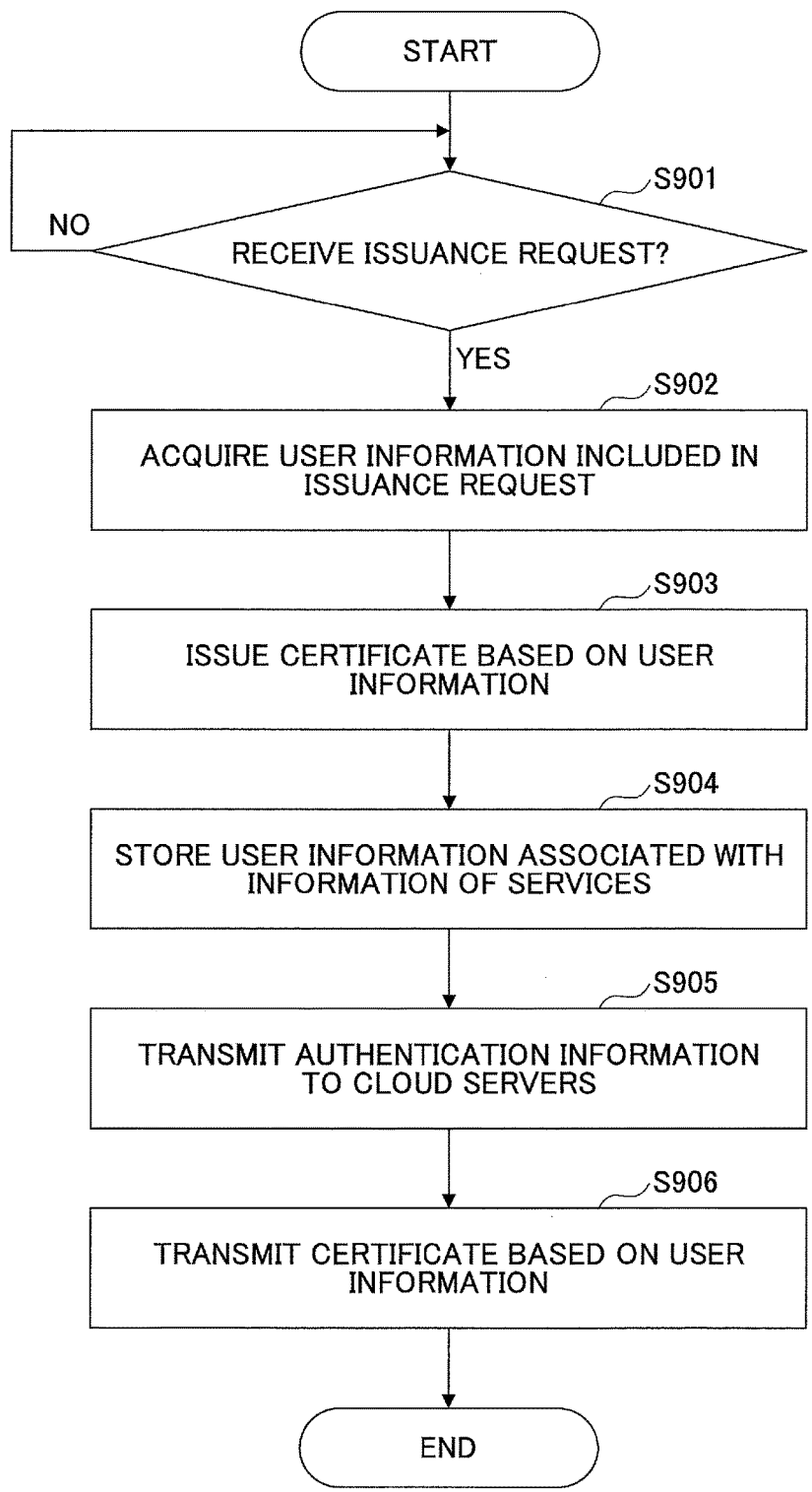
FIG. 9 is a flowchart illustrating an example process of the information processing apparatus of the present embodiment.

FIG. 9 is a flowchart illustrating an example process of the information processing apparatus of the present embodiment.

In step S901, in response to the issuance acceptance unit 501 of the information processing apparatus 101 receiving the issuance request from the information terminal 108 or the cloud server 102, the information processing apparatus 101 performs process of step S902, and following steps.

In step S902, the issuance acceptance unit 501 of the information processing apparatus 101 acquires the user information (user name, company name, e-mail address, etc.) included in the received issuance request.

In step S903, the certificate authority 502 of the information processing apparatus 101 issues the certificate 601 based on the user information acquired in step S902. For example, at least a part of the user information acquired in step S902 is included in the certificate 601.

In step S904, the user information management unit 503 of the information processing apparatus 101 stores the user information acquired in step S902 associated with the information of services that can be used with the certificate issued in step S903 in the user information DB 505 to manage them.

In step S905, the authentication information reporting unit 504 of the information processing apparatus 101 transmits the authentication information 801 to the cloud servers 102 providing the services that can be used with the certificate issued in step S903.

In step S906, for example, the issuance acceptance unit 501 of the information processing apparatus 101 transmits the certificate issued in step S903 to the e-mail address included in the user information of the issuance request received in step S901 by means of e-mail encrypted through S/MIME.

<Process for Using Cloud Service>

FIG. 10 is a sequence diagram illustrating an example process for using the cloud service of the present embodiment. Additionally, when starting the process shown in FIG. 10, the certificate reported from the information processing apparatus 101 has been stored in the information terminal 108. Also, the cloud server 102 has stored the root certificate of the certificate authority 502 of the information processing apparatus 101 and the authentication information 801 reported from the information processing apparatus 101. Also, dotted arrows shown in FIG. 10 indicate operations, etc., of the user.

In step S1001, in response to the user's operation for calling a service selection screen, the image forming apparatus 103 accepts the operation.

Figure 11A:
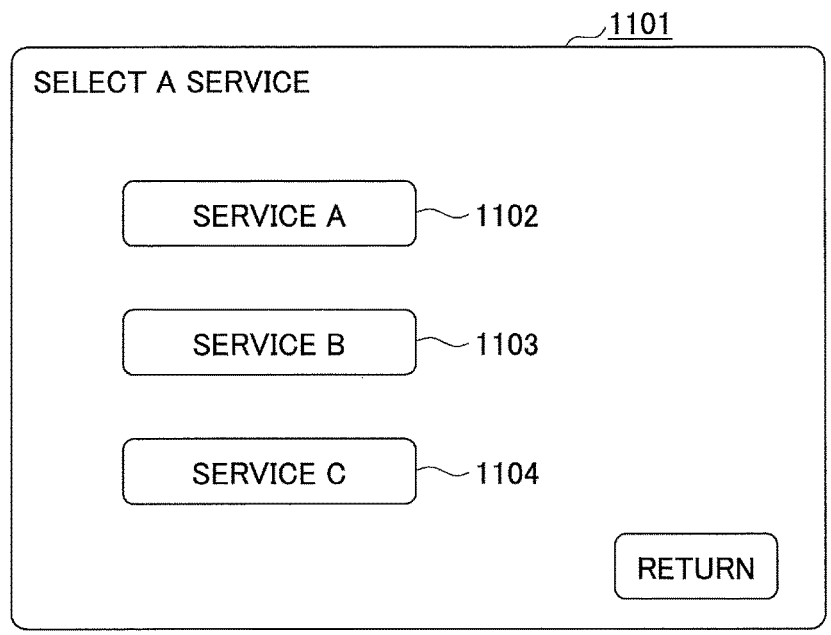
FIG. 11A is a diagram illustrating an example service selection screen.

In step S1002, for example, the display control unit 509 of the image forming apparatus 103 that has accepted the user's operation for calling a service selection screen displays the service selection screen 1101 as shown in FIG. 11A in the operational unit 307 shown in FIG. 3, or the like.

In step S1003, in response to user's operation for selecting a service, the display control unit 509 of the image forming apparatus 103 accepts the operation.

Figure 11B:
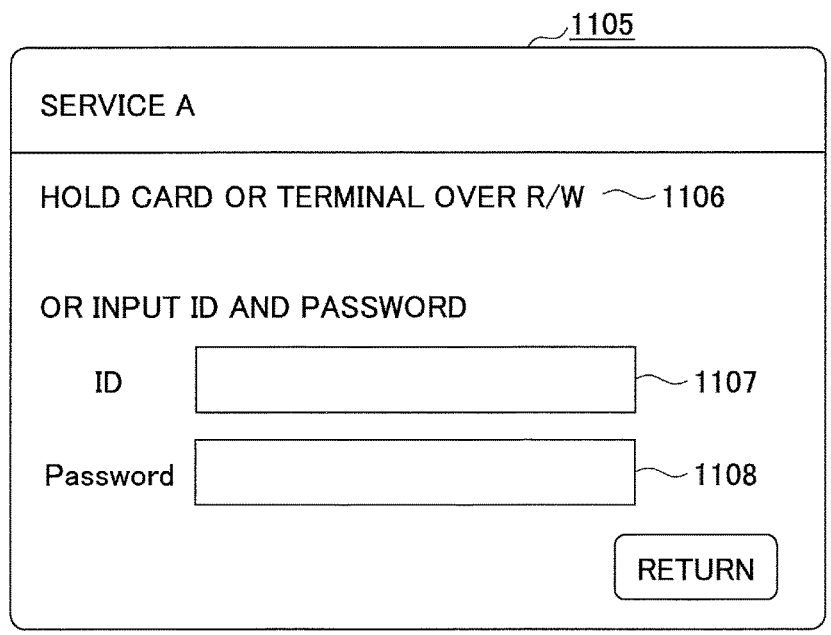
FIG. 11B is a diagram illustrating an example authentication screen.

In step S1004, the display control unit 509 of the image forming apparatus 103 that has accepted the user's operation for selecting a service displays an authentication screen 1105 as shown in FIG. 11B in the operational unit 307 shown in FIG. 3, or the like.

For example, in the service selection screen 1101 shown in FIG. 11A, a button 1102 for selecting "service A", a button 1103 for selecting "service B", a button 1104 for selecting "service C" are displayed. In a case where the user selects the button 1102 for selecting "service A", the authentication screen 1105 for service A is displayed as shown in FIG. 11B.

In the authentication screen 1105 shown in FIG. 11B, for example, a message for prompting the user to have the certificate be read is displayed, where an example message 1106 that "hold card or terminal over R/W" is displayed. Preferably, in the authentication screen 1105, a field 1107 for inputting a user ID, a field 1108 for inputting a password, etc., are displayed so that a user who does not have the certificate can be navigated.

In step S1005, for example, the user holds the information terminal 108 over (brings the information terminal 108 close to) the NFC R/W unit 308 of the image forming apparatus 103 to have the certificate be read. In step S1006, the certificate acquisition unit 506 of the image forming apparatus 103 acquires the certificate from the information terminal 108.

In step S1007-S1017, the authentication processing unit 507 of the image forming apparatus 103 performs an authentication process 1000 using SSL protocol, or the like.

For example, in step S1007, the image forming apparatus 103 transmits a message "Client Hello" to the cloud server 102 providing the service that has been selected in the service selection screen 1101 shown in FIG. 11A. The message "Client Hello" is transmitted when a client of SSL connects to a server of SSL, and includes, for example, information indicating encryption methods that can be used in the client, and the like.

In step S1008, in response to receiving the message "Client Hello", the cloud server 102 transmits a message "Server Hello" to the image forming apparatus 103. The message "Server Hello" includes information for designating an encryption method to be used among the encryption method included in the message "Client Hello", and the like.

In step S1009, the cloud server 102 transmits a message "Server Certificate" including the certificate of the cloud server 102 to the image forming apparatus 103. For example, information of the root certificate of the certificate authority 502 of the information processing apparatus 101, etc., are included in the certificate.

In step S1010, the cloud server 102 transmits a message "Certificate Request" to the image forming apparatus 103, thereby requesting the image forming apparatus 103 to transmit the certificate.

In step S1011, the cloud server 102 transmits a message "Server Hello Done" to the image forming apparatus 103, where the message "Server Hello Done" indicates that a series of "Hello" messages exchange has finished.

In step S1012, the image forming apparatus 103 transmits a message "Client Certificate" including the certificate of the image forming apparatus 103 to the cloud server 102.

In step S1013, the image forming apparatus 103 transmits random digits referred to as premaster secret by means of a message "Client Key Exchange".

In step S1014, the image forming apparatus 103 reports the cloud server 102 that the image forming apparatus 103 communicates with the cloud server 102 using the designated encryption algorithm by means of a message "Change Cipher Spec".

In step S1015, the image forming apparatus 103 transmits a message "Finished" indicating that information items for establishing the communication is prepared to the cloud server 102.

In step S1016, the cloud server 102 transmits a massage "Change Cipher Spec" indicating that the communication is performed with the designated encryption algorithm to the image forming apparatus 103.

In step S1017, the cloud server 102 transmits a message "Finished" indicating that information items for establishing the communication is prepared to the image forming apparatus 103.

By performing processes described above, a bidirectional authentication between the image forming apparatus 103 and the cloud server 102 using SSL protocol is finished.

Additionally, in the present embodiment, respective cloud servers 102 (e.g., cloud servers 102a, 102b and 102c) that can be used with the certificate issued by the information processing apparatus 101 have held the root certificate of the certificate authority 502 of the information processing apparatus 101 and the authentication information.

Therefore, the user of the electronic apparatus such as the image forming apparatus 103 can use the cloud services respectively provided by the cloud servers 102a, 102b and 102c with one certificate issued by the information processing apparatus 101.

SUMMARY

The information processing system (100) of the present embodiment includes: an acceptance unit (501) configured to accept an issuance request of an electronic certificate that can be used in the electronic apparatus (103, 104,105 and 106) used by one or more users; an issuance unit (502) configured to issue the electronic certificate based on the issuance request accepted by the acceptance unit (501); a management unit (503) configured to store information of the electronic certificate issued by the issuance unit (502) associated with information of the plurality of services that can be used with the electronic certificate; and a reporting unit (504) configured to report authentication information (801) to the servers (102a, 102b and 102c) providing the plurality of services based on the information (505) stored in the management unit (503).

Thus, the user of the electronic apparatus (103) can access respective servers (102a, 102b and 102c) providing the services with one certificate issued in the information processing system (100).

Therefore, according to the information processing system (100), user's workload for using a plurality of cloud services, where an electronic apparatus (103) used by a plurality of users is used in the cloud services.

Additionally, aforementioned reference numerals in parentheses and names are provided for understanding the embodiment, and they are non-limiting examples.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2015-108593 filed on May 28, 2015, the entire contents of which are hereby incorporated herein by reference.

What is claimed is:

1. An information processing system comprising:
an electronic apparatus; and
an information processing apparatus including a memory, and a processor that
is coupled to the memory and that is configured to:
receive an issuance request of one electronic certificate that is available in the electronic apparatus used by one or more users, wherein the electronic apparatus has received the electronic certificate in advance from the information processing apparatus;
issue the one electronic certificate based on the received issuance request;
store, in the memory, information in which the issued one electronic certificate is associated with a plurality of services that can be used with the one electronic certificate, the plurality of services being provided respectively by a plurality of servers;
transmit the one electronic certificate to an information terminal; and
transmit authentication information for determining validity of the one electronic certificate to the plurality of servers associated with the one electronic certificate, the authentication information being associated with the one electronic certificate,
wherein the electronic apparatus displays a screen including items corresponding to the respective services,
wherein the electronic apparatus obtains the one electronic certificate from the information terminal when a selection operation is performed by a user to select an item from the items in the screen,
wherein the electronic apparatus transmits the one electronic certificate to a server, corresponding to the selected item, of the plurality of servers such that authentication is performed based on the one electronic certificate and the authentication information to allow the user to use a service corresponding to the selected item, and
wherein the electronic apparatus includes a processor configured to:

acquire the one electronic certificate issued by the processor of the information processing apparatus; and perform an authentication process for being authorized to use the plurality of services provided by the plurality of servers, the authentication process being performed based on the one electronic certificate.

2. The information processing system according to claim 1, wherein
the authentication information includes information of expired electronic certificate among electronic certificates.

3. The information processing system according to claim 1, wherein
the authentication information includes information of the one electronic certificate.

4. The information processing system according to claim 1, wherein the issuance request of the one electronic certificate includes user information of the one electronic certificate, the processor further storing, in the memory, the user information of the certificate.

5. The information processing system according to claim 1, wherein the processor includes a certificate authority of Public Key Infrastructure.

6. The information processing system according to claim 5, wherein the plurality of servers providing the services respectively hold a root certificate of the certificate authority.

7. A method for managing electronic certificate issued by an information processing apparatus including a memory and a processor coupled to the memory, the method comprising:
receiving an issuance request of one electronic certificate that is available in an electronic apparatus used by one or more users, wherein the electronic apparatus has received the electronic certificate in advance from the information processing apparatus;

issuing the one electronic certificate based on the received issuance request;

storing, in the memory, information in which the one electronic certificate issued is associated with a plurality of services that can be used with the one electronic certificate, the plurality of services being provided respectively by a plurality of servers;

transmitting the one electronic certificate to an information terminal; and transmitting authentication information for determining validity of the one electronic certificate to the plurality of servers associated with the one electronic certificate, the authentication information being associated with the one electronic certificate, wherein the electronic apparatus displays a screen including items corresponding to the respective services, wherein the electronic apparatus obtains the one electronic certificate from the information terminal when a selection operation is performed by a user to select an item from the items in the screen, wherein the electronic apparatus transmits the one electronic certificate to a server, corresponding to the selected item, of the plurality of servers such that authentication is performed based on the one electronic certificate and the authentication information to allow the user to use a service corresponding to the selected item, and wherein the electronic apparatus includes a processor configured to:

acquire the one electronic certificate issued by the processor of the information processing apparatus; and perform an authentication process for being authorized to use the plurality of services provided by the plurality of servers, the authentication process being performed based on the one electronic certificate.

* * * * *